(12) United States Patent  
Geiger et al.

(10) Patent No.: US 8,594,444 B2
(45) Date of Patent: Nov. 26, 2013

(54) METHOD AND SYSTEM FOR ENHANCING DIGITAL IMAGES

(75) Inventors: Paul Geiger, Toronto (CA); Vittorio Accomazzi, Toronto (CA)

(73) Assignee: Merge Healthcare Incorporated, Chicago, IL (US)

( * ) Notice: Subject to any disclaimer, the term of this patent is extended or adjusted under 35 U.S.C. 154(b) by 1424 days.

(21) Appl. No.: 12/118,307

(22) Filed: May 9, 2008

(65) Prior Publication Data

US 2008/0205785 A1 Aug. 28, 2008

Related U.S. Application Data

(63) Continuation of application No. PCT/CA2006/001707, filed on Oct. 19, 2006.

(60) Provisional application No. 60/739,000, filed on Nov. 23, 2005.

(51) Int. Cl.
*G06K 9/00* (2006.01)

(52) U.S. Cl.
USPC .......... 382/240; 382/254; 382/266; 382/261; 382/274; 382/299

(58) Field of Classification Search
USPC .......... 382/240, 254, 260, 263–266, 274, 299
See application file for complete search history.

(56) References Cited

U.S. PATENT DOCUMENTS

| | | | |
|---|---|---|---|
| 5,020,120 A | 5/1991 | Weldy | |
| 5,241,373 A * | 8/1993 | Kanamori et al. | 348/645 |
| 5,271,064 A | 12/1993 | Dhawan et al. | |
| 5,461,655 A | 10/1995 | Vuylsteke et al. | |
| 5,467,404 A | 11/1995 | Vuylsteke et al. | |
| 5,561,724 A | 10/1996 | Kido et al. | |

(Continued)

FOREIGN PATENT DOCUMENTS

| | | |
|---|---|---|
| EP | 0574969 A2 | 12/1993 |
| EP | 0712092 A1 | 5/1996 |

(Continued)

OTHER PUBLICATIONS

Office Action from the Japanese Patent Office for Application No. 2008541554 dated May 24, 2011 (Partial Translation and Original, 5 pages).

(Continued)

*Primary Examiner* — Wesley Tucker
(74) *Attorney, Agent, or Firm* — Michael Best & Friedrich LLP

(57) ABSTRACT

A system and method for enhancing digital images is described. A digital image is transformed into a series of decomposed images in frequency bands, or different resolution grids. A decomposed image is noise suppressed and contrast enhanced. Representative value of signal at each pixel is computed based on contributions to signals from pixels in a neighborhood of the pixel. Lookup tables are applied to pixel values to selectively enhance signal in a predetermined range of signal strength. Another set of lookup tables are applied to pixel values to suppress noise components contained therein. Optionally, operations are applied to decomposed images to suppress quantum noise, enhance object edges or enhance global contrast, among others. These decomposed images, after signal enhancement and noise suppression, are then recombined to result in an enhanced image.

29 Claims, 8 Drawing Sheets

(56) References Cited

U.S. PATENT DOCUMENTS

| | | |
|---|---|---|
| 5,805,721 A | 9/1998 | Vuylsteke et al. |
| 5,960,123 A | 9/1999 | Ito |
| 5,978,518 A * | 11/1999 | Oliyide et al. ............ 382/260 |
| 6,347,161 B1 | 2/2002 | Mancuso |
| 6,512,854 B1 | 1/2003 | Mucci et al. |
| 6,771,793 B1 | 8/2004 | Yamada |
| 2003/0095714 A1 | 5/2003 | Avinash |

FOREIGN PATENT DOCUMENTS

| | | |
|---|---|---|
| JP | 10075364 | 3/1998 |
| JP | 10075395 | 3/1998 |
| JP | 2000306089 | 11/2000 |
| JP | 2001057677 | 2/2001 |
| JP | 2001167264 | 6/2001 |
| JP | 2002133410 | 5/2002 |
| JP | 2002133410 A | 5/2002 |
| JP | 2002183727 | 6/2002 |
| JP | 2005277503 | 10/2005 |
| JP | 2005277503 A | 10/2005 |

OTHER PUBLICATIONS

Office Action from the Japanese Patent Office for Application No. 2008541554 dated Apr. 10, 2012 (Partial Translation and Original, 4 pages).

International Search Report from PCT/CA2006/001707.

Bessler, R.F. et al.; "Contrast Enhancement using Burt Pyramid Processing"; SID International Symposium; Digest of Technical Papers; May 1986; pp. 352 to 352.

Burt, Peter J.; et al.; "The Laplacian Pyramid as a Compact Image Code"; IEEE Transactions on Communications; Apr. 1983; pp. 532 to 540; vol. Com-31, No. 4.

Vulsteke P. et al.; Multiscale Image Contrast Amplification (MUSICA™); SPIE; 1994; pp. 551 to 560; vol. 2167.

\* cited by examiner

METHOD AND SYSTEM FOR ENHANCING DIGITAL IMAGES

CROSS REFERENCE TO RELATED APPLICATIONS

The present application is a continuation of PCT International Patent No. PCT/CA2006/001707 filed on Oct. 19, 2006 which claims priority from U.S. Provisional Patent Application No. 60/739,000 filed on Nov. 23, 2005, both of which are incorporated herein by reference.

FIELD OF INVENTION

The invention relates generally to the field of digital image processing. In particular, the invention relates to a method and system for enhancing digital images.

BACKGROUND OF INVENTION

In the field of digital imaging, and more particularly medical imaging, objects of interest may not always be sufficiently visible, often due to two contributing factors. One is the presence of excessive noise. Noise is always present in medical images, such as Magnetic Resonance Imaging (MRI), Computerized Tomography (CT), ultrasound and radiographic (X-ray) images. In general, signal to noise ratio, and therefore, image visibility, may be improved with increased patient exposure or dose, or both. However, such increase often tends to adversely affect a patient's health and therefore is generally to be avoided whenever possible. There is thus a trade-off between image noise and patient exposure and dose.

Poor contrast in digital images, especially medical images, often is another contributing factor to the poor visibility of objects of interest in these images. The presence of both noise and poor contrast often further reduces the visibility of object structures in images. The contrast problem arises also because of the mismatch between the dynamic range of most medical imaging devices and the dynamic range of image rendering devices. Generally, the dynamic range of a digital image tends to be much larger than the dynamic range of most films and display devices. For example, a chest X-ray image has a very broad range of pixel values since X-rays are readily transmitted through the lungs but highly attenuated by the mediastinum. Consequently, it is difficult to simultaneously observe both the lungs and the mediastinum in a single image due to the limitation of display devices. Simplistic methods for compressing the dynamic range lead to low overall contrast and/or loss of subtle details. It is common to address this problem by allowing simple interactive adjustments of the contrast and brightness. But, such adjustments cannot usually produce acceptable contrast throughout the entire image simultaneously, and in any case they are considered too time consuming in clinical settings.

There is thus an urgent need to display digital images, in particular medical images, on film or computer screens, in such a way that all relevant details of an object of interest, such as details relevant to diagnosing diseases, are enhanced, namely simultaneously visible with acceptable contrast.

Many different image processing techniques have been developed to address this need, including histogram equalization, unsharp masking, and noise smoothing. However, such methods have had only limited success.

More recently, multiscale methods have been introduced and applied to the image enhancement problem, with significantly better results. However, the solutions proposed are not entirely satisfactory. For example, U.S. Pat. No. 5,461,655 discloses a multiscale method but is primarily concerned with noise reduction, not contrast or edge enhancement. According to this method, the noise is estimated using a local standard deviation, which tends to give unreliable results in a region containing edges of imaged objects, namely, in a region where image signal strength varies greatly. U.S. Pat. Nos. 5,467,404 and 5,805,721 describe contrast enhancement via non-linear lookup tables applied to each sub-band image in a multiscale decomposition. However, each pixel value is modified based on the pixel's current value alone, without regard to its location in an image nor the values of pixels in the neighborhood of the pixel. This method tends to enhance the noise as well as the signal, as it does not distinguish between the two. Similarly, U.S. Pat. No. 5,960,123 describes an algorithm very similar to that of U.S. Pat. Nos. 5,467,404 and 5,805,721. Hence the method disclosed therein also tends to enhance both the noise and the signal.

It is an object of the present invention to mitigate or obviate at least one of the above mentioned disadvantages.

SUMMARY OF INVENTION

The present invention provides a system and method for enhancing digital images. A digital image is transformed into a series of decomposed images in frequency bands, or different resolution grids. A decomposed image is noise suppressed and contrast enhanced A representative value of the signal at each pixel of at least a portion of the image is computed based on contributions to signals from pixels in a neighborhood of the pixel. Lookup tables are applied to the representative values of signal to selectively enhance signal in a predetermined range of signal strength. Another set of lookup tables, depending on representative values of a neighborhood, are applied to pixel values to suppress noise components contained therein. Optionally, operations are applied to decomposed images to suppress quantum noise, enhance object edges or enhance global contrast, among others. These decomposed images, after signal enhancement and noise suppression, are then recombined to result in an enhanced image.

In a first aspect of the invention, a method of processing a digital image is provided. The method includes the steps of decomposing the digital image into a series of images of different spatial resolutions, modifying at least one image of the series of images, the modification including selectively altering pixel value of each pixel of at least a portion of the one image based on an estimate of a neighborhood value computed from pixel values of pixels in a neighborhood of the each pixel, recombining the series of images, after modification, into a processed digital image.

In one feature of this aspect of the invention, the estimate is computed from a one-dimensional convolution of pixel values along a direction of minimum variation or a path of minimum variation and an enhancement function is applied to the estimate to obtain an selectively altered pixel value of the each pixel.

In another aspect, there is provided a system for processing a digital image. The system includes an image retrieval module for acquiring the digital image, a decomposition module for decomposing the digital image into a series of images of different spatial resolutions, a filter for modifying at least one image of said series of images, said modification including selectively altering pixel value of each pixel of at least a portion of said one image based on an estimate of a neighborhood value computed from pixel values of pixels in a neighborhood of said each pixel, and a reconstruction module for recombining said series of images, after modification, into a processed digital image.

In one feature of this aspect of the invention, the system further includes an amplitude estimator. The amplitude estimator is configured to compute a one-dimensional convolution of pixel values along a direction of minimum variation in the neighborhood. The computed estimate is proportional to the one-dimensional convolution of pixel values.

In another feature of this aspect of the invention, the system further includes a median filter of a pre-determined kernel radius for applying to at least one image to obtain an auxiliary image $I_{med}$, and a noise estimation module for computing a robust standard deviation of $I_{med}$. The estimate is computed as a constant multiple of a ratio of absolute value of pixel value of $I_{med}$ at each pixel to the robust standard deviation.

In another aspect, there is provided a method of suppressing noise in a digital image. The digital image consists of spatially related pixels, whose pixel values have a signal component representing the digital image and a noise component. The method includes the steps of finding a representative value of the signal component at each pixel of at least a portion of the image based on contributions to signal components from pixels in a neighborhood of the each pixel, estimating a noise value at the each pixel from a robust standard deviation of an auxiliary image at the pixel, and applying a suppression function to the pixel value to obtain a replacement pixel value for the pixel. The suppression function monotonically decreases as a ratio of the noise value to the representative value increases.

In yet another aspect of the invention, there is provided a method of enhancing a digital image. The digital image consists of spatially related pixels, whose pixel values have a signal component representing the digital image. The method includes the steps of identifying a path of minimum variation of pixel values at each pixel of at least a portion of image, finding a representative value of the signal component at the each pixel computed from pixel values of pixels along the path, and applying a transform function to the representative value to find a signal enhanced pixel value for the each pixel. The transform function emphasizes a signal range.

In other aspects the invention provides various combinations and subsets of the aspects described above.

BRIEF DESCRIPTION OF DRAWINGS

For the purposes of description, by way of example only, but not of limitation, the foregoing and other aspects of the invention are explained in greater detail with reference to the accompanying drawings, in which.

DETAILED DESCRIPTION OF EMBODIMENTS

Figure 1:
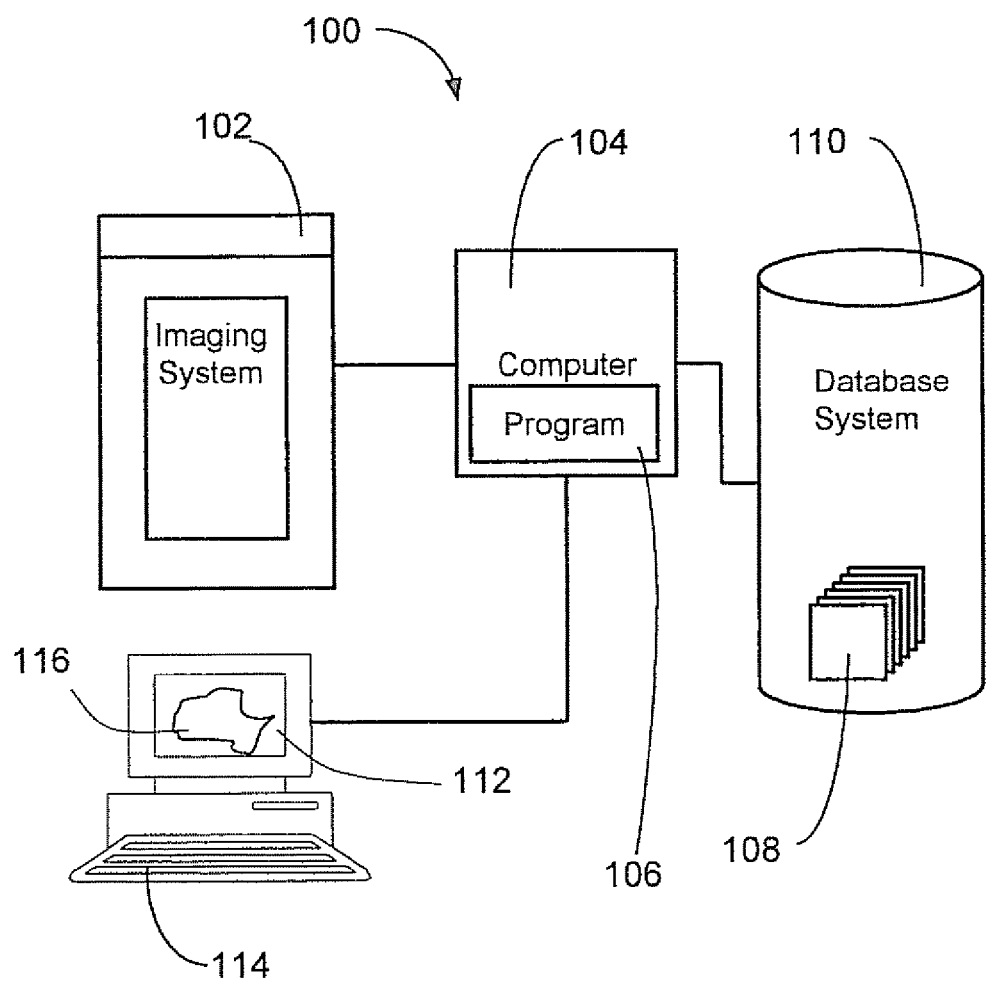
FIG. 1 is a schematic diagram depicting the components of an image acquisition and processing system.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Referring to FIG. 1, a system for acquiring image data of a subject, enhancing image object structures from the image data and displaying such structures, is indicated generally at numeral 100. Although the embodiment is described with reference to the enhancement of object structures from images obtained by medical imaging systems, it may also be applied to the enhancement of other types of image object structures from images other than from such systems, such as from, for example, geological survey imaging systems.

Turning back to FIG. 1, the system 100 comprises a medical imaging system 102 to interrogate a patient and supply image data to a computer 104 from which an image can be created. The computer 104 includes a program 106 for running on the computer, and to manipulate and display the data obtained from the imaging system. Usually, during an imaging session, the medical imaging system 102 scans a patient, producing a series of images of the patient's body. These images are composed of pixels, each corresponding to a measurable predetermined parameter, such as a density value.

The program 106 stores the images as a data-set 108 in a database system 110. Of course, the program 106 can also retrieve from the database system 110 a pre-scanned image for further processing, such as further enhancement as described in more detail below. The image data is stored as a set of spatially related data points representing variations in a predetermined parameter such as density value. The data points can be displayed on the screen display 112 to illustrate variations in the parameters, for example, the density variation of the anatomical structure as being imaged. They can be displayed as variations in color or gray scale.

The data and resultant images stored in the database system 110 are accessed via a user interface 114 for display on a display 112. If the display 112 is touch sensitive, then the display 112 itself can be employed as the user interface 114. Typically, the user interface 114 includes input devices such as a keyboard, mouse, an audio detection device coupled with a voice recognition program, or other suitable devices, for receiving inputs from a user. The user interface 114 provides facility for an operator to interact with the system, and more particularly, for selecting areas of the display image 116 for identifying structures to be processed or to set various parameters of the system.

The program 106 comprises a set of machine readable instructions, which may be stored on a computer readable medium. Such a medium may include hardware and/or software such as, by way of example only, magnetic disks, magnetic tape, optically readable medium such as CD ROM's, and semi-conductor memory such as PCMCIA cards. In each case, the medium may take the form of a portable item such as a small disk, floppy diskette, cassette, or it may take the form of a relatively large or immobile item such as hard disk drive, solid state memory card, or RAM provided in the computer 104. It should be noted that the above listed example mediums can be used either alone or in combination.

Figure 2:
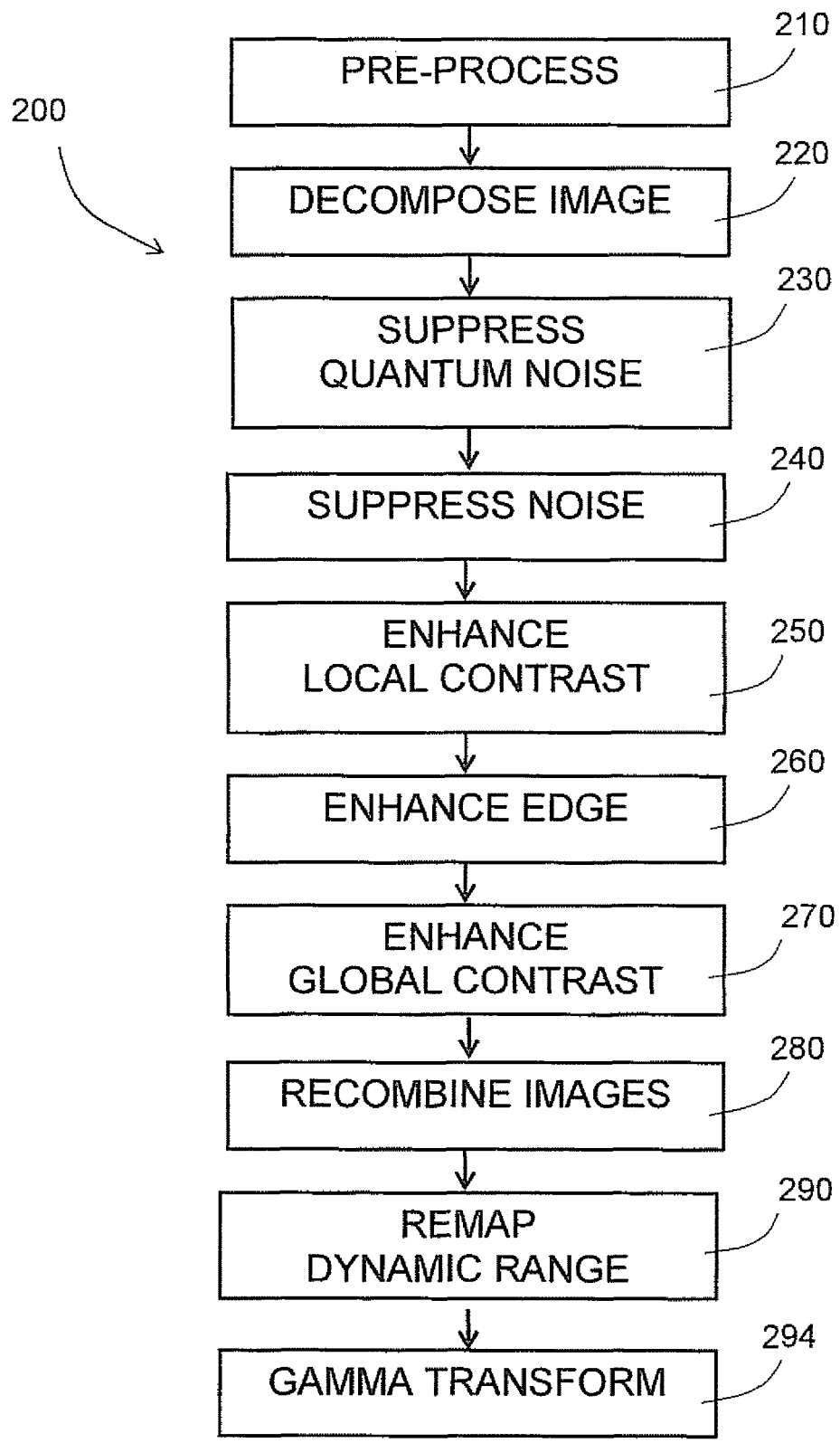
FIG. 2 illustrates steps of a process for enhancing digital images acquired or processed by the system shown in FIG. 1.

Referring to FIG. 2, there is shown schematically an image enhancing process 200 for enhancing digital images. A digital image I is provided at the start of the process, for enhancing the image structures contained therein. The digital image may be directly supplied by the imaging system 102, or may be retrieved by an image retrieval module (not shown) of the computer program 106 from the database system 110. The process 200 is implemented as cooperative modules of computer program 106, with each step shown in FIG. 2 corresponding to a module of computer program 106. However, although the process is described as being executed by modules of a computer program 106, it will be appreciated that the process can be implemented as firmware as well. With appropriate adaptation, some (or all) steps of the process, such as decomposition into different resolution bands, local noise suppression, local contrast enhancement, and enhancement of global contrast, can be implemented as hardware components, too. For example, instead of implementing a software process for computing an estimated value as descried in detail below, a hardware estimator may be constructed to achieve the same purpose. In other words, the methods described herein are not restricted to software implementations.

In general terms, the process 200 is a decomposition, modification and reconstruction process. Although each step is described as an operation applied to the entire image or the entirety of a decomposed image, it will be understood that in practice, the operation may be applied to only a portion or portions of an image, either in all steps, or in some of the steps. Each step is also not necessarily applied to a portion corresponding to the same region (or regions) in the original image. For example, a local noise suppression step may be applied only to a region that is considered more noisy while a local contrast enhancement operation is applied only to another region where signal strength is weak. Of course, where a decomposition is applied to one region of the image, the corresponding reconstruction is generally applied to the same region of the image.

A digital image is first decomposed into a series of images of different spatial resolutions (step 220). After a number of different noise suppression and contrast enhancement operations (steps 230 to 270), an enhanced digital image is reconstructed from the series of decomposed images by recombining them (step 280). The noise suppression and contrast enhancement operations applied prior to the reconstruction include a structure-based noise suppression (step 240) and a local contrast enhancement (step 250). At step 240, a suppression function, depending on an estimate of a neighborhood value, is applied to pixel values of a decomposed image to suppress noise without unnecessarily suppressing large variations of signal in a small area (i.e., edge of imaged objects). Similarly, pixel values of decomposed images are selectively enhanced (step 250) to enhance local contrast. This is achieved by estimating a second neighborhood value at each pixel, and applying an enhancement function to said second neighborhood value. Optionally, some pre-process and post-process steps can be applied to provide further improvement to the quality of the image. Each of these steps will now be described in detail below in reference to FIG. 2.

The process 200 starts with an optional pre-process block 210. This is a step for transforming the image to one that is more suitable for further processing. Generally, an image can be pre-processed at this step to suppress any high-frequency noise. In one exemplary implementation, the image is convolved with a small kernel designed to suppress highest frequency components in the image. Symbolically, $$I' = K \circ I,$$

where I and I' are the original and modified images, respectively. K is the kernel, and the operator "$\circ$" represents convolution. Any arbitrary kernel that has a small kernel radius can be specified. Typically a Gaussian kernel of radius 1 or 2 pixels is used. Such a kernel is known for its ability to suppress high frequency noises. Generally, the convolution described is applied to an image if the image contains strong high frequency noise.

The image pixel values may also be remapped. For example, a logarithmic or power transform can be applied to pixel values to compress and stretch them differently in different strength ranges. In a transmission X-ray image, the measured radiation signal is an exponential function of the total traversed target density. Often, it is more desirable that the pixel values represent the target density of the imaged material, rather the signal strength itself. A logarithmic transform can be applied to obtain the target density itself. Some image acquisition device may perform such a transform. If this transform is not applied by the image acquisition device, this transform step may be applied prior to enhancing the image.

Advantageously, a lookup table ("LUT") can be used in applying a logarithmic transform to transform each image pixel value P of the image I into a new pixel value P', according to a transform function;

$$P' = \alpha \log(P - \gamma) + \beta,$$

where $\alpha$, $\beta$, $\gamma$ are some constants. Generally, $\alpha$, $\beta$, $\gamma$ in the transform function above are chosen so that the range of pixel values in the output image matches that of the input image, i.e., $$P' = \frac{\max - \min}{\log(\max - \min + 1)} \log(P - \min + 1) + \min,$$

where min and max are, respectively, the minimum and maximum pixel values in the image I (before the lookup table is applied).

Next, at a decomposition step 220, the image is decomposed, namely transformed into a series of images, each of the series of images corresponding to or characterized by a spatial resolution. As it is known to those skilled in the art, a variety of methods may be used to decompose the original image. These methods include wavelet decomposition, Fourier transform, sub-band transform, among others. For example, the original image may be decomposed into a series of images of different grid sizes. Or, the original images may be fed into a series of frequency band filters to decompose the original image into different frequency bands. Here, the frequency bands refer to spatial frequency, namely frequency associated with spatial resolution, not temporal frequency. Each band, namely each image selected by the band, is characterized by the central frequency of the band. In a Fourier transform, each decomposed image is characterized by the Fourier frequency.

One suitable decomposition method is Laplacian pyramid decomposition. The Laplacian pyramid decomposition proceeds as follows: First, an auxiliary image $I_{aux}$ is created by blurring the original image I and downsampling the result by 2. One way to blur an image is to convolve the image with, for example, a 3×3 kernel of the form:

$$\begin{bmatrix} 1 & 2 & 1 \\ 2 & 4 & 2 \\ 1 & 2 & 1 \end{bmatrix} * \frac{1}{16}.$$

The exact form of the kernel is not crucial; any kernel suppressing or not introducing high frequency noises in the image is suitable. Finally, an upsampled-by-2 version of the auxiliary image $I_{aux}$ is subtracted from the original image I. The result $I_1$ constitutes the first level of the pyramid; it has the same size as the original image I, but contains only high frequency, namely, fine grid, information.

The second image in the pyramid $I_2$ is constructed by applying the same set of operations to the above-mentioned auxiliary image $I_{aux}$. It is thus one-quarter the size of the first pyramid image $I_1$, and contains a lower band of frequencies. This process is repeated for each subsequent level in the pyramid. Although decomposing the original image I into more levels tends to give better image enhancement, preferably, only 4 or 5 levels of decomposition are performed, as a trade-off between enhancement improvement and computation demand. These pyramid images $I_i$ are fed directly to the next noise suppression step. As will be appreciated, these pyramid and auxiliary images can also be saved to a permanent or temporary storage device.

Figure 3A:
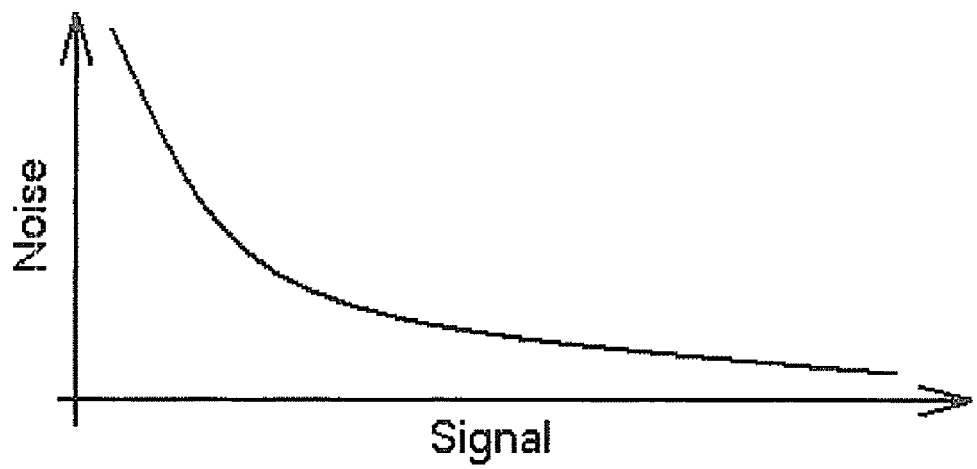
FIG. 3*a* illustrates schematically relationship between signal strength and expected level of noise in x-ray images.

Advantageously, a bright noise suppression step 230 can be applied to all or some of the pyramid images $I_i$. This is more effective at suppressing quantum noise in images, such as X-ray images. Quantum noise causes random fluctuations in the measured X-ray signal, which are proportional to the square root of the underlying signal strength S. Generally, one applies a logarithm transform to an X-ray image before the X-ray image is processed and displayed. Pixel values of an X-ray image therefore typically vary with the logarithmic value of signal strength. Consequently, quantum noise often diverges as $1/\sqrt{S}$ at small signal strength. FIG. 3a shows schematically the expected increase of noise level at small signal values. Since X-ray images are conventionally displayed with an inverted palette, i.e., small signal values correspond to bright regions in a displayed image, it will be appreciated that quantum noise becomes more prominent in bright regions of X-ray images.

A technique designed to suppress quantum noise involves filtering a pyramid image $I_i$ so that the intensity is essentially unchanged if it is above a threshold value t but is reduced by a multiplicative factor if the intensity is below the threshold value t. The multiplicative factor, or filter function, is so chosen so that it approaches zero faster than, or at least no slower than, the rate quantum noise diverges at small signal strength. In other words, the product of the multiplicative factor and the expected quantum noise approaches a constant value, or does not diverge, as the signal strength approaches zero. This restrains the quantum noise from diverging at small signal strength. In one implementation, the filter function has the following form:

$$M(r) = \begin{cases} \dfrac{\sqrt{s(r)}}{t}, & \text{if } \sqrt{s(r)} < t \\ 1, & \text{otherwise} \end{cases}$$

Here, s(r) is an estimate of the signal strength S(r), i.e., S at location r. Any reasonable estimate can be used. Preferably, s(r) is an estimate including contributions to S(r) from pixels in a neighborhood of r. For example, an estimate of s(r) can be obtained as the pixel value of a downsampled and blurred version of the original image I at location r. The original image I is first downsampled to the size of pyramid image $I_i$, and then blurred with a kernel:

$$\begin{bmatrix} 1 & 2 & 1 \\ 2 & 4 & 2 \\ 1 & 2 & 1 \end{bmatrix} * \frac{1}{16}.$$

The pixel value of the resulting downsampled and blurred image at location r serves as s(r) in the filter function.

Figure 3B:
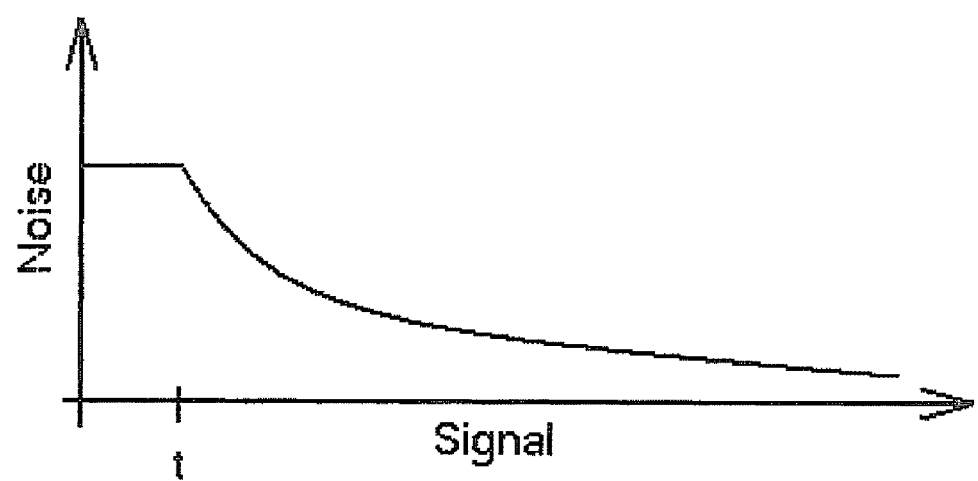
FIG. 3*b* illustrates schematically a resulting relationship between signal strength and noise after applying a portion of the process shown in FIG. 2 to a digital x-ray image.

As will be appreciated, this functional form of the filter function M(r) is selected so that its product with the expected noise gives a relatively constant intensity at small signal values, where quantum noise is expected to dominate. This noise reduction and limitation achieved by applying M(r) is shown in FIG. 3b. As will be appreciated, in this particular form of M(r), t is a parameter that controls both the amount of noise reduction and the threshold signal value at which noise reduction is applied. In general, separate parameters can be used to control separately the amount of noise reduction and the threshold signal value.

Next, a structure-based noise suppression step 240 is performed on the pyramid images. A noise suppression function is applied to pixel values of a pyramid image to suppress the noise component contained therein. This step attempts to suppress noise without blurring or suppressing image structures of interest. At each pixel, the noise suppression function is constructed using an estimate of signal based on pixel values in a neighborhood of the pixel. As will be appreciated, pixel values generally have a signal component and a noise component. In noisy regions of an image, the noise component of a pixel value exceeds the signal component in strength. For example, the Laplacian pyramid images obtained from the decomposition step typically have large areas of small-amplitude noise, punctuated by small areas of large-amplitude signals of structure (i.e., edges of imaged objects). Separating the noisy regions from the signal regions in an image and then suppressing the pixel values in the noisy regions tends to reduce the noise level in general. Once the separation of noisy regions and signal regions is achieved, the pixel values are selectively altered: pixel values in the noisy regions are suppressed, but pixel values in the signal regions are not modified.

Suppression of the noise component can be achieved in different ways. Any approach that can achieve the separation of signal regions from noisy regions can be used. In one approach, a value representative of the pixel values in a small neighborhood of a pixel is first evaluated. This representative value can be evaluated based on, for example, a median value of the pixel values in the neighborhood. This representative value can be regarded as the typical signal amplitude in the neighborhood. The noise amplitude can be obtained by, for example, evaluating the median of the representative values over the whole image. Noisy regions can be identified as regions where the noise contributions exceed the signal contributions, i.e., regions where noise makes up a significant component of the pixel values. Another approach to separation of signal regions from noise regions is to estimate the typical signal amplitude in each neighborhood by evaluating the standard deviation of pixel values in the neighborhood, and estimate the noise amplitude by evaluating the standard deviation of the representative values over the whole image. Pixel values in the noisy regions are suppressed, but pixel values in the signal regions are not modified.

Figure 4:
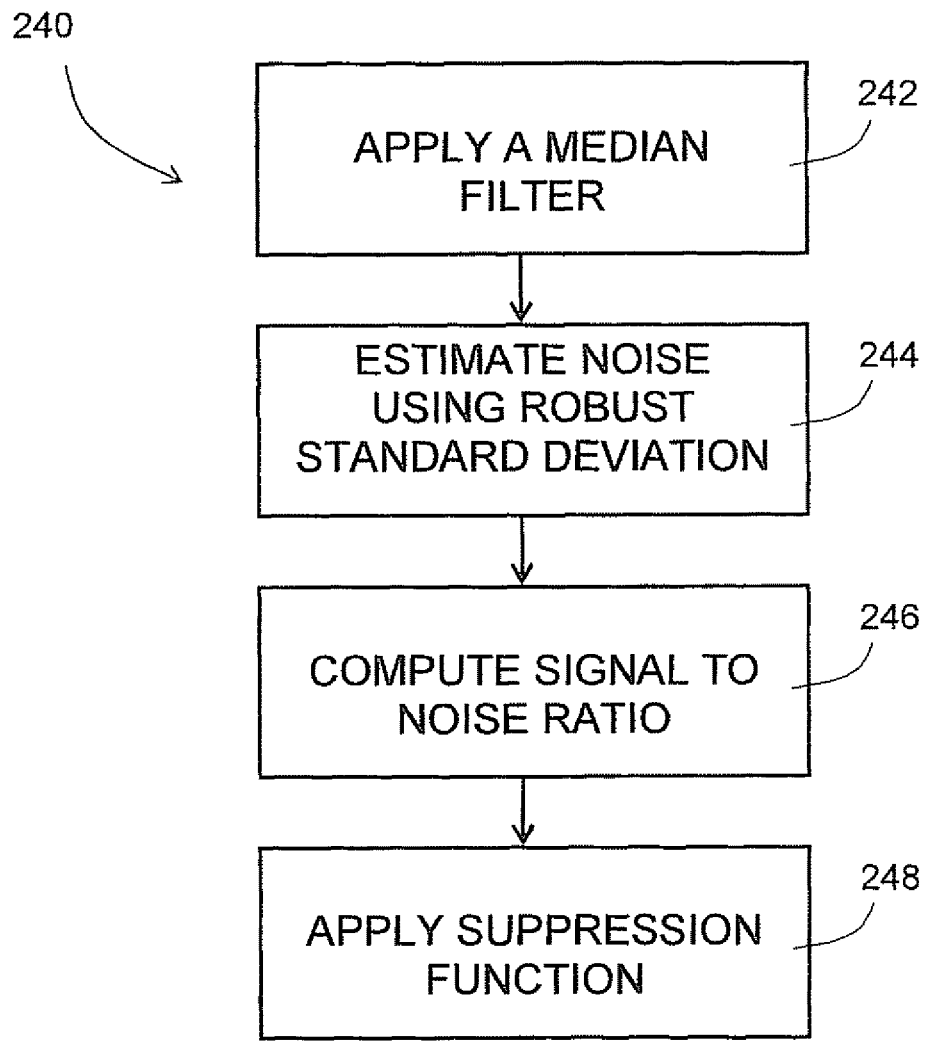
FIG. 4 shows detailed steps for suppressing noise corresponding to a step of the process shown in FIG. 2.

FIG. 4 illustrates in detail the steps followed in an approach for suppressing noise based on separation of noisy regions from signal regions. At step 242, an auxiliary image is first constructed. Pixel values of the auxiliary image are obtained by applying a median filter to pyramid image $I_i$. The resulting image, $I_{med}$, is composed of pixels whose pixel values represent signal strength of the original pixels as evaluated in the pixel's neighborhood. The kernel radius of the median filter is adjustable. Typically, it is in the range of 1 to 5 pixels. In one preferred implementation, the kernel radius is 3 pixels.

At step 244, the amplitude of noise in $I_{med}$ is estimated using a robust standard deviation method. To estimate N, the amplitude of noise, the robust standard deviation of $I_{med}$ is calculated using the following equation, $$N = 1.5 * \text{median}(|I_{med}(r) - \text{median}(I_{med})|),$$

where $I_{med}(r)$ is the pixel value at location r in the auxiliary image $I_{med}$.

As noted above, the Laplacian pyramid images obtained from the decomposition step typically have large areas of small-amplitude noise, punctuated by small areas of large-amplitude structure (i.e., edges of imaged objects). In such situations, it is found that a non-robust calculation may mistakenly treat the large-amplitude fluctuation caused by the imaged structure, namely large-amplitude signal, as noise. Thus, a non-robust calculation tends to overestimate the noise. The approach based on the robust standard deviation generally tends to be better at taking into account large-amplitude signal variations caused by small areas of image structures.

Once an estimate of noise is obtained, an estimate of signal to noise ratio SN can be computed. Generally, $I_{med}(r)$ can be considered as a measure of the typical pixel value in the neighborhood of r. To estimate SN at step 246, one approach is to compute SN from $SN = |I_{med}(r)|/(\kappa * N)$ as an estimate of signal to noise ratio, where κ is an adjustable parameter.

Next, a suppression function $f$ is applied to the pixel value I(r) of the pyramid image at step 248. The suppression function decreases as the estimate of noise increases. It may have a form, for example, that approaches 0 when the contributions from noise in the local neighborhood far exceed the contributions from signal in the neighborhood. In one embodiment, at each pixel location r, the pixel value I(r) is multiplied by the factor $$f = \frac{|I_{med}(r)|}{|I_{med}(r)| + (\kappa * N)},$$

or, equivalently, $$f = \frac{1}{1 + (\kappa * N)/|I_{med}(r)|} = \frac{1}{1 + 1/SN}$$

Figure 5:
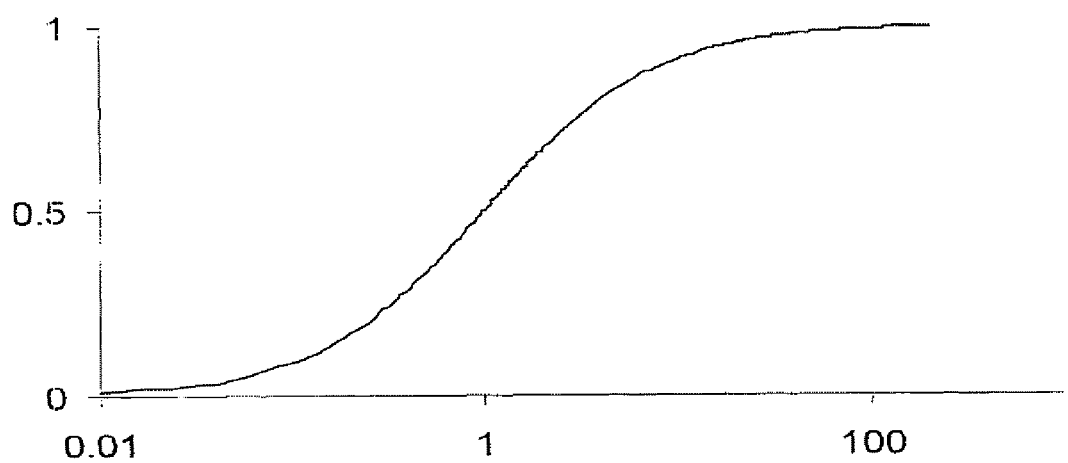
FIG. 5 shows a suppression function (or lookup table) that can be used in the process illustrated in FIG. 4.

Thus if κ*N is large compared to $|I_{med}(r)|$, i.e., if SN<<1, then r is probably in a region containing mainly noise, and so I(r) should be suppressed. The factor $f$ performs such suppression, because it is much less than 1 whenever (κ*N) is much larger than $|I_{med}(r)|$. Conversely, if (κ*N) is small compared to $|I_{med}(r)|$, then r is probably in a region containing object structure, and so I(r) should not be suppressed. This is achieved because $f \approx 1$ whenever SN>>1. Although a specific functional form of $f$ is shown here, the particular form of the suppression function $f$ is not crucial. Any monotonically increasing function can be used. Preferably, it is bound between 0 and 1. However, as only the relative values of $f$ over the range between SN<<1 and SN>>1 are of significance, such a bound is not necessary and is only a normalization convention. FIG. 5 shows the variation of $f$ as a function of SN, with SN plotted in logarithmic scale.

Returning to FIG. 2, at step 250, local contrast is enhanced. To enhance local contrast, at each pixel, a representative value of signal strength is first evaluated based on contributions from pixels in the pixel's neighborhood. Whether to enhance the pixel depends on the representative value. If the representative value falls within a pre-determined range, it is enhanced; otherwise it is suppressed. This tends to enhance the local contrast, i.e., signal strength, without unnecessarily amplifying the noise component in the image.

As will be appreciated, across local edge boundaries of imaged objects, image signal strength tends to change prominently. This large change in signal strength reflects the structure of the imaged object. Including pixels of large amplitude change in the estimate of the representative value tends to smooth out the edge boundaries, which is undesirable. When evaluating a representative pixel value from pixel values in a local neighborhood, it is therefore desirable to exclude pixels in the neighborhood that contribute to large-amplitude variation in signal strength. By excluding these pixels, the remaining pixels in the neighborhood are generally on the same side of the boundary as the pixel for which its representative signal strength is computed.

Figure 7:
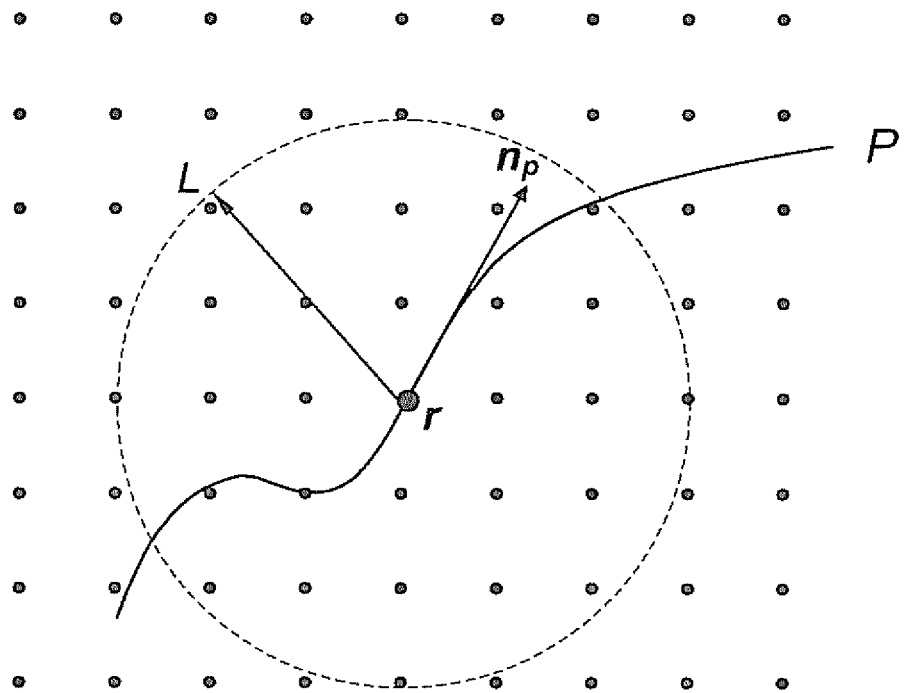
FIG. 7 is a schematic diagram depicting a path of minimal variation and a direction of minimum variation at a pixel in a digital image.

In one implementation, this exclusion is achieved by selecting for computing the estimate only those pixels along a path of minimum variation P or in a direction of minimum variation $n_p$ (FIG. 7). Near an edge boundary, a direction of minimum variation or the path of minimum variation does not cross the edge boundary. The estimate evaluated along the path of minimum variation or direction of minimum variation excludes contributions from pixels of large-amplitude structures (i.e., edges), and therefore tends to represent signals contributed by pixels from the same side of the edge boundary. Any artifacts due to variation across an edge boundary are thus avoided.

Although evaluating an estimate along a path or direction of minimum variation is used as an example here, any other method can be used as long as it excludes from the estimate contributions from pixels of large-amplitude structures in the neighborhood. For example, in another implementation, when computing the representative value for a pixel based on pixel values in its neighborhood, pixels representing edges of imaged object in the neighborhood is first identified. Pixels in the neighborhood on the opposite side of the edge boundary are excluded from the computation so the representative value is computed from pixel values of pixels on the same side of the edge boundary.

Although the following description makes references to Laplacian pyramids images, the method described herein applies in general to any images, including an original digital image that is not decomposed. It is found that the method is especially suitable in regions containing local edge boundaries.

Figure 6:
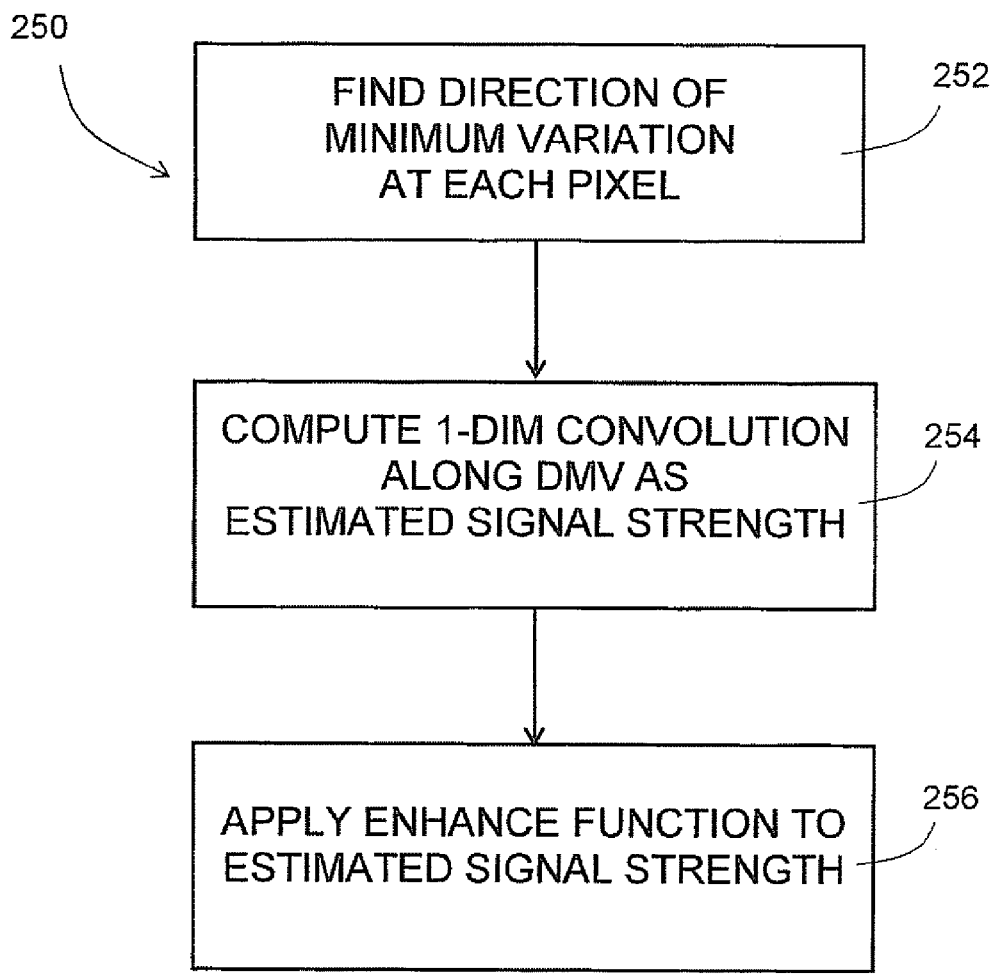
FIG. 6 shows detailed steps for enhancing local contrast in digital images corresponding to a step of the process shown in FIG. 2.

FIG. 6 illustrates in detail steps followed in an exemplary implementation to enhance local contrast in an image. At each pixel, or point r, a direction of minimum variation is first determined at step 252. This direction is determined by, for example, first calculating the variation V in several equally spaced directions;

$$V_n = \sum_{i=-L}^{L} |I(r+in) - I(r)|$$

where I(r) is the image intensity at point r, n is one of the direction vectors (typically, 8 directions are used, but the actual number is an adjustable parameter), and L is the radius of the convolution kernel, which is also an adjustable parameter. The direction of minimum variation $n_p$ is the direction along which $V_n$ is the smallest.

Next, at step 254, a value representing signal strength at r is computed. This can be computed by performing a one-dimensional convolution along the direction $n_p$, with a Gaussian kernel. This provides an estimate of the signal strength, $I_G(r)$. The size of the kernel is adjustable. Preferably, the kernel radius is 1 or 2 pixels. Convolution with a Gaussian kernel of this size tends to suppress the highest frequencies in the image. It will be appreciated that other suitable kernels also can be used, provided that they provide a good estimate of signal strength. In other words, any kernel or any method that provides a good estimate of signal but also suppresses noise can be used. Where a larger kernel is used, it is preferred that the convolution is performed along the path of minimum variation P that passes through r. As will be appreciated, within a small neighborhood around the pixel, the path of minimum variation P coincides with a straight line defined by the direction of minimum variation $n_p$.

Once the signal strength estimate $I_G(r)$ is obtained, a local contrast enhancement function $f_E$ as a function of the estimate, $I_G(r)$, is applied at step 256 to the estimate, $I_G(r)$. The local contrast enhancement function $f_E$ is generally chosen so that pixel values of I(r) in a selected strength range are enhanced relative to pixel values outside the selected strength range, to improve the local contrast. This gives an improved new pixel value, $I_{E,i}(r)$, which then becomes the pixel value at r in an enhanced image $I_{E,i}$. Here, $I_{E,i}$ represents the enhanced image of the i-th level of the pyramid, obtained from $I_i$ after the local contrast enhancement step 250 is applied to the i-th level of the pyramid, $I_i$.

Figure 8:
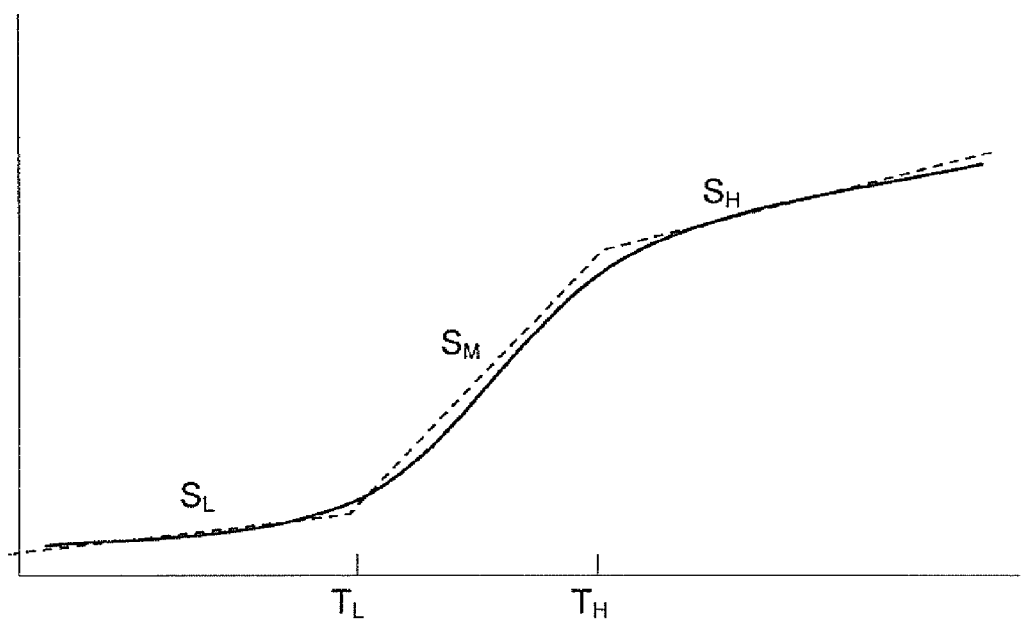
FIG. 8 shows an enhancement function that can be used in the process illustrated in FIG. 6.

FIG. 8 shows an enhancement function $f_E$. The enhancement function $f_E$ shown in FIG. 8 is constructed by smoothing a piecewise-linear curve that consists of three sections. The piecewise-linear curve is shown in dashed lines. To make the piecewise-linear curve more visible, it is displaced slightly to the left. The three sections of the piecewise-linear curve are: (1) for pixel values less than a lower threshold $T_L$, the slope of the segment is $S_L$; (2) for pixel values between $T_L$ and an upper threshold $T_H$, the slope of the segment is $S_M$, such as 1; and (3) for pixel values greater than $T_H$, the slope of the segment is $S_H$. The values $T_L$, $T_H$, $S_L$, $S_M$ and $S_H$ are all parameters adjustable by a user. Typically, $S_L \neq S_H$ though this is not necessary. Pixel values in a selected range, namely the region between thresholds $T_L$ and $T_H$, are enhanced relative to pixel values outside the selected range. The slope $S_M$ in the middle region, or the enhancement region, is larger than the slopes $S_L$ and $S_H$ outside the enhancement region to provide the selective enhancement.

Advantageously, the enhancement function $f_E$ can be implemented as a lookup table to improve computation efficiency and speed. Lookup tables can be appropriately constructed or chosen for particular image types. Each level of the pyramid may also have its own lookup table, i.e., $f_E$. Steps 252 to 256 are repeated for each pixel in the image until all pixels in the image are processed and an enhanced image $I_{E,i}$ is obtained.

As will be understood, this local contrast enhancement may be applied to all Laplacian pyramid images, or only to some of the Laplacian pyramid images. Whether to apply the local contrast enhancement to all Laplacian pyramid images or only some (or maybe even only one) of them is a trade-off between performance and image quality of the enhanced image. Further, while a particular implementation may predetermine to which Laplacian pyramid images the local contrast enhancement will be applied, especially when there are many levels of Laplacian pyramid, this may also be left as a user choice.

Similarly, while the local contrast enhancement is described as an operation applied to a Laplacian pyramid image, it will be understood that the operation may be applied to the original image, too. In fact, any modification steps, such as local noise suppression step 240 described earlier, the local contrast enhancement step 250, and the edge enhancement step 270 that will be described in detail below, may all be applied to any image, including the original image not necessarily a Laplacian pyramid image. Each may be implemented as a stand-alone filter, for enhancing digitized images, or they may also be combined to form a multi-pass filter. In addition, as indicated earlier, each such filter may be implemented as a firmware, or even from hardware components, provided the hardware filters provide the characteristics as described herein.

In step 260, each level of Laplacian pyramid, whether its noise has been suppressed or local contrast has been enhanced, may be processed to enhance the boundary edges. A variety of methods can be applied to achieve edge enhancement. One simple approach is to multiply all Laplacian pyramid images by weighting factors that are greater than or equal to one. This has the effect of enhancing edges in the respective frequency band (i.e., grid resolution) of each image. For example, multiplying the first level of the pyramid $I_1$ by a factor greater than 1 amplifies edges of imaged objects that are of order 1 to 2 pixels wide. Multiplying the second level of the pyramid $I_2$ by a factor greater than 1 amplifies edges that are of order 2 to 4 pixels wide, and so on. The weights are adjustable parameters. Advantageously, they can be tuned for each particular image type and/or left as user preference 2 parameters for better edge enhancement. The weighting factor for the final level of the pyramid, namely the pyramid image corresponding to the coarsest grid, is fixed at 10. As will be appreciated, only the relative values of the weighting factors at each level affect the outcome of edge enhancement. Fixing the weighting factor at the final level of the pyramid is simply a normalization convention.

Prior to reconstruction of the decomposed image, large-scale, global contrast can be enhanced in a global contrast enhancement step 270. This is an optional step. In general, this step can be applied independent of other enhancement or noise suppression steps. In this optional step, unsharp masking is used to enhance the overall contrast of the image. Unsharp masking proceeds by subtracting a Gaussian-blurred version of an image from the image itself;

$$I_{E,i}' = I_{E,i} - \lambda G(\sigma) \circ I_{E,i},$$

where $G(\sigma)$ is a Gaussian kernel of width $\sigma$, and $\lambda$ is a parameter between 0 and 1 that controls the amount of contrast enhancement. Both $\lambda$ and $\sigma$ are adjustable parameters.

Because this global contrast enhancement step tends to affect only large-scale contrast variations, advantageously, this step can be applied only to the final level i.e., $I_{aux}'$. This tends to improve performance without significant loss of improvement to contrast enhancement. The parameter $\sigma$ is typically quite large (of order one-tenth the image size).

The reconstruction step 280 applies a reverse algorithm corresponding to the decomposition step 220 to reconstruct an enhanced and noise suppressed image, from the series of images that are individually enhanced and noise suppressed. The reverse algorithm used to recombine decomposed images is determined by the decompositions method. If no intervening modifications described at steps 230 to 270 are applied to the decomposed images, applying the reverse algorithm to the series of decomposed images obtained at step 220 produces the original input image A, or a very good approximation thereof, subject to any information loss during the decomposition and reconstruction operations.

Where a Laplacian pyramid method is used to decompose the original image, summation of the Laplacian pyramids reconstructs an enhanced and noise suppressed image from the modified Laplacian pyramid images. In this step, the modified levels of the Laplacian pyramid are simply upsampled and summed to give a resultant processed image. The pyramid data structure can be discarded at this step. As will be appreciated, the selection of a reconstruction procedure depends on the details of the decomposition procedure. In one implementation, reconstruction of images decomposed following a Laplacian pyramid decomposition described at step 220 can proceed as follows:

(1) The image at a particular level of the pyramid $I_i$ is resampled onto a grid whose size is equal to that of the previous pyramid level $I_{i-1}$. This resampling is done using, for example, either linear interpolation or nearest-neighbor interpolation. As will be appreciated, the choice of interpolation type is made for each image, based on a trade-off between speed and image quality. In general, nearest neighbor method tends to be faster but lower in quality. Other suitable resampling methods also can be used. The resampling method should be the same one used in the decomposition process.

(2) The resulting image $I_i$ is convolved with the 3×3 kernel of the form $$\begin{bmatrix} 1 & 2 & 1 \\ 2 & 4 & 2 \\ 1 & 2 & 1 \end{bmatrix} * \frac{1}{16}.$$

This is the same kernel used in the decomposition process.

(3) The result is added to the previous pyramid level $I_{i-1}$. These steps are repeated for all decomposed pyramid levels, starting from $I_{aux}'$, until all decomposed pyramid levels are summed.

The step 290, dynamic range stretching, provides a mapping of the dynamic range of the reconstructed image to the pixel range of the input image. In this optional step, the pixel value range of the reconstructed image from step 280 is stretched or contracted to match the pixel value range of the input image. Rather than a simple linear scaling, a sigmoid-shaped lookup table can be used. The low and high thresholds of the sigmoid curve can be adjustable parameters for achieving the desired range mapping.

In order to improve subjective image quality, a gamma transform can be optionally applied to the image as a final step 294. Gamma transform may take the form:

$$P' = (\max - \min)\left(\frac{P - \min}{\max - \min}\right)^\gamma + \min,$$

where γ is a parameter adjustable by a user or the system. In general, γ is a value selected from the range 0.5 to 2. However, γ can be a user-adjustable parameter. A user may select any other values, based on the user's perceived subjective image quality of the resulting image.

The gamma transform described above is a remapping of the image pixel values based on a particular functional form, namely $y=x^\gamma$. Many other functional forms are possible, and in general any arbitrary monotonic lookup table can be applied as a final step to improve the image contrast.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A method of processing a digital image, the method comprising the steps of:
    decomposing the digital image into a series of images of different spatial resolutions,
    modifying, at a processor, at least one image of said series of images, said modification including, selectively altering a pixel value of each edge pixel of at least a portion of said one image based on an estimate of a neighborhood value, said estimate being computed from pixel values of pixels in a neighborhood of said each edge pixel, and said estimate emphasizing contributions from pixels lying in directions generally aligned with a direction of minimum variation of pixel values at said each edge pixel; and
    recombining said series of images, after modification, into a processed digital image.

2. The method of claim 1, wherein said estimate excludes contributions from pixels in said neighborhood whose pixel values have magnitude variations significantly exceeding that of other pixels in said neighborhood.

3. The method of claim 1, wherein said estimate is computed from a one-dimensional convolution of pixel values along the direction of minimum variation.

4. The method of claim 1, wherein said estimate is computed from-a one-dimensional convolution of pixel values along a path of minimum variation.

5. The method of claim 3 wherein an enhancement function is applied to said estimate to obtain an selectively altered pixel value of said each edge pixel.

6. The method of claim 4, wherein an enhancement function is applied to said estimate to obtain an selectively altered pixel value of said each edge pixel.

7. The method of claim 5, wherein said enhancement function increases monotonically in a predetermined range of signal strength and has a rate of change larger in said predetermined range than outside said predetermined range.

8. The method of claim 1, wherein said estimate is a signal to noise ratio and a suppression function depending on said estimate is applied to said pixel value to obtain a selectively altered pixel value of said each edge pixel.

9. The method of claim 8, further comprising the steps of:
    prior to said modification, applying a median filter of a pre-determined kernel radius to said at least one image to obtain an auxiliary image $I_{med}$, and
    computing a robust standard deviation of $I_{med}$, wherein said estimate is computed as a constant multiple of a ratio of absolute value of pixel value of $I_{med}$ at said each edge pixel to said robust standard deviation at said each edge pixel.

10. The method of claim 8, wherein said suppression function decreases with said signal to noise ratio.

11. The method of claim 1, further comprising the step of applying a filter function to an image of said series of images to suppress noise contributions contained therein, said application of said filter function preventing said noise contributions from diverging when signal strength is below a threshold value.

12. The method of claim 1, further comprising the step of enhancing object edge structures in an image of said series of images.

13. The method of claim 1, further comprising the step of applying unsharp masking to an image of said series of images to enhance global contrast of said processed digital image.

14. The method of claim 1, further comprising the step of remapping of pixel value ranges of said processed digital image to match that of said digital image.

15. The method of claim 1, further comprising the step of applying a gamma transform to said processed digital image.

16. The method of claim 1, further comprising the step of applying a logarithmic transform to said digital image prior to its decomposition into said series of images.

17. The method of claim 1, further comprising the step of convolving said digital image to suppress high frequency components prior to its decomposition into said series of images.

18. A system for processing a digital image, the system comprising:
a program recorded on non-transitory computer-readable medium, the program including:
an image retrieval module for receiving the digital image;
a decomposition module for decomposing the digital image into a series of images of different spatial resolutions;
a filter for modifying at least one image of said series of images, said modification including selectively altering a pixel value of each edge pixel of at least a portion of said one image based on an estimate of a neighborhood value, said estimate being computed from pixel values of pixels in a neighborhood of said each edge pixel, and said estimate emphasizing contributions from pixels lying in directions generally aligned with a direction of minimum variation of pixel values at said each edge pixel; and
a reconstruction module for recombining said series of images, after modification, into a processed digital image.

19. The system of claim 18, wherein the program further includes an amplitude estimator, said amplitude estimator being configured to compute a one-dimensional convolution of pixel values along the direction of minimum variation in said neighborhood, wherein said estimate is proportional to said one-dimensional convolution.

20. The system of claim 18, wherein the modification includes applying a lookup table to said estimate to selectively enhance pixel values in a predetermined range of signal strength.

21. The system of claim 18, wherein the program further includes:

a median filter of a pre-determined kernel radius for applying to said at least one image to obtain an auxiliary image $I_{med}$; and
a noise estimation module for computing a robust standard deviation of $I_{med}$;
wherein said estimate is computed as a constant multiple of a ratio of absolute value of pixel value of $I_{med}$ at said each edge pixel to said robust standard deviation at said each edge pixel.

22. The system of claim 21, wherein modification includes obtaining from said estimate a selectively altered pixel value of said each edge pixel based on a lookup table decreasing with said estimate.

23. The system of claim 18, further comprising:
an imaging system for acquiring the digital image, wherein the image retrieval module receives the digital image from said imaging system.

24. The system of claim 18, further comprising:
a database system of pre-acquired digital images, wherein the image retrieval module receives the digital image from said database system.

25. A program recorded on non-transitory computer-readable medium for use in an image processing system, the image processing system decomposing a digital image into a series of images of different spatial resolutions for filtering and recombining said series of images, after being filtered, into a processed digital image, the program comprising:
a neighborhood value estimator for providing an estimate of a neighborhood value for each pixel of at least a portion of one image of said series of images, said estimate being computed from pixel values of pixels in a neighborhood of said each pixel on a same side of a nearest boundary as said each pixel, and said estimate emphasizing contributions from pixels lying in directions generally aligned with a direction of minimum variation of pixel values at said each pixel, and
a pixel modifier for modifying said each pixel value of said portion of said one image, said modification including selectively altering said each pixel value based on said estimate.

26. The program of claim 25, wherein the neighborhood value estimator applies a lookup table to said estimate to selectively enhance said each pixel value in a predetermined range of signal strength.

27. The program of claim 25, further comprising:
a median filter of a pre-determined kernel radius for applying to said one image to obtain an auxiliary image $I_{med}$;
a noise estimator for computing a robust standard deviation of $I_{med}$;
wherein said estimate is computed as a constant multiple of a ratio of absolute value of pixel value of $I_{med}$ at said each pixel to said robust standard deviation at said each pixel.

28. The program of claim 27, wherein the neighborhood value estimator obtains from said estimate a selectively altered pixel value of said each pixel based on a lookup table decreasing with said estimate.

29. The program of claim 25, further comprising an amplitude estimator, said amplitude estimator computing a one-dimensional convolution of pixel values along the direction of minimum variation in said neighborhood, wherein said estimate is proportional to said one-dimensional convolution.

* * * * *